(12) United States Patent
Naimer et al.

(10) Patent No.: US 7,095,338 B2
(45) Date of Patent: Aug. 22, 2006

(54) TCAS VSI DISPLAY

(76) Inventors: Ted Naimer, Via Moscia 118, Ascona, TI (CH) CH 6612; Sam Hyatt, 305 Riversong Way, Alpharetta, GA (US) 30022; Jim Brannen, 1854 Jenna Lyn Ct., Lawrenceville, GA (US) 30043; Tom Lawrence, 405 Ocala Dr., Knoxville, TN (US) 37918

( * ) Notice: Subject to any disclaimer, the term of this patent is extended or adjusted under 35 U.S.C. 154(b) by 286 days.

(21) Appl. No.: 10/679,976

(22) Filed: Oct. 7, 2003

(65) Prior Publication Data
US 2005/0073441 A1 Apr. 7, 2005

(51) Int. Cl.
*G08G 1/95* (2006.01)

(52) U.S. Cl. ............... 340/907; 340/961; 340/973; 701/9

(58) Field of Classification Search ........ 340/907, 340/961, 973, 974, 975, 984; 701/9, 14
See application file for complete search history.

(56) References Cited

U.S. PATENT DOCUMENTS

| | | | | |
|---|---|---|---|---|
| 3,621,210 A * | 11/1971 | Canning et al. | ............ | 340/961 |
| 3,668,622 A | 6/1972 | Gannett et al. | ............ | 340/27 |
| 4,247,843 A | 1/1981 | Miller et al. | ............ | 340/27 |
| 4,750,127 A | 6/1988 | Leslie et al. | ............ | 364/428 |
| 4,774,670 A | 9/1988 | Palmieri | ............ | 364/446 |
| 4,786,905 A * | 11/1988 | Muller | ............ | 340/975 |
| 4,860,007 A | 8/1989 | Konicke et al. | ............ | 340/973 |
| 4,914,733 A | 4/1990 | Gralnick | ............ | 340/961 |
| 5,179,377 A | 1/1993 | Hancock | ............ | 340/961 |
| 5,185,606 A | 2/1993 | Verbaarschot et al. | ...... | 340/961 |
| 5,227,786 A | 7/1993 | Hancock | ............ | 340/961 |
| 5,248,968 A | 9/1993 | Kelly et al. | ............ | 340/961 |
| 5,250,947 A | 10/1993 | Worden et al. | ............ | 340/973 |
| 5,367,297 A * | 11/1994 | Yokoyama | ............ | 340/984 |
| 5,382,954 A | 1/1995 | Kennedy, Jr. et al. | ...... | 340/961 |
| 5,493,309 A | 2/1996 | Bjornholt | ............ | 342/455 |
| 5,668,542 A | 9/1997 | Wright | ............ | 340/971 |
| 5,739,770 A | 4/1998 | Liden | ............ | 340/976 |
| 5,872,526 A | 2/1999 | Tognazzini | ............ | 340/961 |
| 5,920,321 A | 7/1999 | Owen et al. | ............ | 345/427 |
| 6,085,150 A | 7/2000 | Henry et al. | ............ | 701/301 |
| 6,154,151 A * | 11/2000 | McElreath et al. | ......... | 340/970 |
| 6,259,378 B1 | 7/2001 | Block | ............ | 340/963 |
| 6,271,768 B1 | 8/2001 | Frazier, Jr. et al. | ......... | 340/961 |
| 6,400,283 B1 | 6/2002 | Berlioz et al. | ............ | 340/975 |
| 6,459,411 B1 * | 10/2002 | Frazier et al. | ............ | 342/455 |
| 6,507,288 B1 | 1/2003 | Block | ............ | 340/963 |
| 6,525,674 B1 * | 2/2003 | Kelly et al. | ............ | 340/970 |
| 6,571,155 B1 | 5/2003 | Carriker et al. | ............ | 701/3 |
| 6,683,541 B1 | 1/2004 | Staggs et al. | ............ | 340/961 |
| 6,703,945 B1 * | 3/2004 | Kuntman et al. | ......... | 340/961 |
| 2003/0132860 A1 | 7/2003 | Feyereisen et al. | ......... | 340/973 |
| 2004/0113816 A1 | 6/2004 | Maris | ............ | 340/971 |
| 2004/0210355 A1 | 10/2004 | Gaidelis | ............ | 701/4 |

* cited by examiner

*Primary Examiner*—John Tweel, Jr.
(74) *Attorney, Agent, or Firm*—Standley Law Group LLP

(57) ABSTRACT

A graphical display of a vertical speed indicator showing "fly-to" and "no-fly" commands on the periphery of a vertical speed indicator during TCAS traffic or resolution advisory conditions.

16 Claims, 2 Drawing Sheets
(2 of 2 Drawing Sheet(s) Filed in Color)

TCAS VSI DISPLAY

BACKGROUND AND SUMMARY OF THE INVENTION

Situational awareness refers to the degree of accuracy by which one's perception of his current environment mirrors reality. With regard to the operation of an aircraft, situational awareness relates to a pilot's perception of what is happening to the aircraft within the four dimensions of space and time. Situational awareness also relates to the pilot's comprehension of a present situation and a projection of the status of the aircraft into the near future.

During the operation of an aircraft, multiple operational parameters and systems must be monitored simultaneously, including the airspeed, attitude, engines, fuel management, navigation indicators, and weather radar. Many of these operational parameters and systems on the aircraft must be supervised by a pilot reacting to subtle changes in the alignment of needles on gauges or of pictorial displays on screens.

The present invention relates to improved displays of aircraft operation data that increase the situational awareness of a pilot and flight crew. The present application claims new displays or presentations of aircraft data. The displays of the present invention employ commercially available systems that may be used without modification to supply the necessary signals to operate the displays of the present invention. The present invention relates to improved displays of aircraft operation data that increase the situational awareness of a pilot and flight crew. More particularly, the displays of the present invention include a vertical speed indicator (VSI) display.

Traffic alert and Collision Avoidance System (TCAS) is a system for detecting and tracking other aircraft approaching the vicinity of a TCAS-equipped aircraft. By continuous interrogation of the transponders of the approaching aircraft, the TCAS system estimates and updates the flight paths of the approaching aircraft relative to the TCAS-equipped aircraft. Through the projection of the approaching flight paths of other planes relative to the position and path of the TCAS-equipped aircraft, the TCAS system will determine if an approaching aircraft is a possible collision hazard. If a collision hazard exists according to TCAS, the system will issue visual and auditory advisories, also known as resolution advisories, to the crew for appropriate vertical avoidance maneuvers.

The present invention includes the display of "fly-to" commands on a vertical speed indicator during a TCAS traffic or resolution advisory condition. The present invention typically includes a representation of an arc or semicircular depiction of a vertical speed indicator scale. The present invention may also comprise a marker, such as a pointer, or a viewing window having a digital numeric display showing the current vertical speed of the TCAS-equipped aircraft. The display of the present invention may also comprise indices or graduations along the arc or semicircle that are representative of typical analog-type displays. For example, a display of the present invention may have a vertical speed scale showing a continuous range of indices matching the typical markings of analog scales such as 0 (zero), +/−500, +/−1000, +/−1500, +/−2000, +/−2500, +/−3000, +/−4000, +/−5000, and +/−6000 feet per minute. It is also possible for examples of the present invention to arrange said indices in a nonlinear fashion around the scale. Also typical of an example of the present invention is the showing of no-fly segments around the periphery of the VSI scale in a red color, and conversely, fly-to segments may be shown in a green color. In addition, examples of the present invention may include other uses of color, particularly the red color as an indicator of no-fly segments and green at fly-to segments, on elements such as the marker, the digital display or other elements in a viewing window, or on the periphery of the VSI scale. It is also possible for examples of the present invention to include a change in size, in particular an enlargement of the VSI display on a typical viewing device, in order to provide additional visual cues to a flight crew in order to indicate determinations of TCAS or resolution advisory flight conditions for an aircraft.

Examples of the present invention may also include representations of fractional sections of a VSI scale. The fractional section may be shown either on a semicircle, as a fixed arc, or along a portion of an ellipse. The particular portion of a VSI scale shown with an example of the present invention would typically present the current vertical speed of an aircraft on the VSI scale bounded equidistant by the range of the values for vertical speed shown on that portion of the VSI scale. This type of display may be provided by linear or nonlinear distributions of the indices for reading along the VSI scale. Conversely, the VSI scale may by bounded on at least one end by an upper limit, such as −6000 or +6000 feet per minute. To assist the flight crew in the readability of the display of the present invention, on the occasion wherein the actual VSI was at or above an upper (or lower) limit or extreme of the VSI scale, the VSI scale may at least provide an additional indicia marking such as the 0 (zero) mark to provide a frame of reference. It is also possible for an indicator such as the vertical speed marker having a numeric display to show actual vertical speed figures beyond the range of the displayed VSI scale, for example +/−9999 feet per minute.

In addition to the features mentioned above, objects and advantages of the present invention will be readily apparent upon a reading of the following description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Novel features and advantages of the present invention, in addition to those mentioned above, will become apparent to those skilled in the art from a reading of the following detailed description in conjunction with the accompanying drawings wherein similar reference characters refer to similar parts and in which.

DETAILED DESCRIPTION OF THE EXAMPLE PREFERRED EMBODIMENTS

The example embodiments herein described are not intended to be exhaustive or to limit the invention to the precise forms disclosed. They are chosen and described to explain the principles of the invention and the application of the method to practical uses so that others skilled in the art may practice the invention.

The Primary Flight Display (PFD) utilized in the example embodiments of the present invention is a dynamic, color display of all of the parameters necessary for flight path control. A typical PFD provides data related to an aircraft in flight including heading, airspeed, altitude, attitude, and vertical speed.

Figure 1:
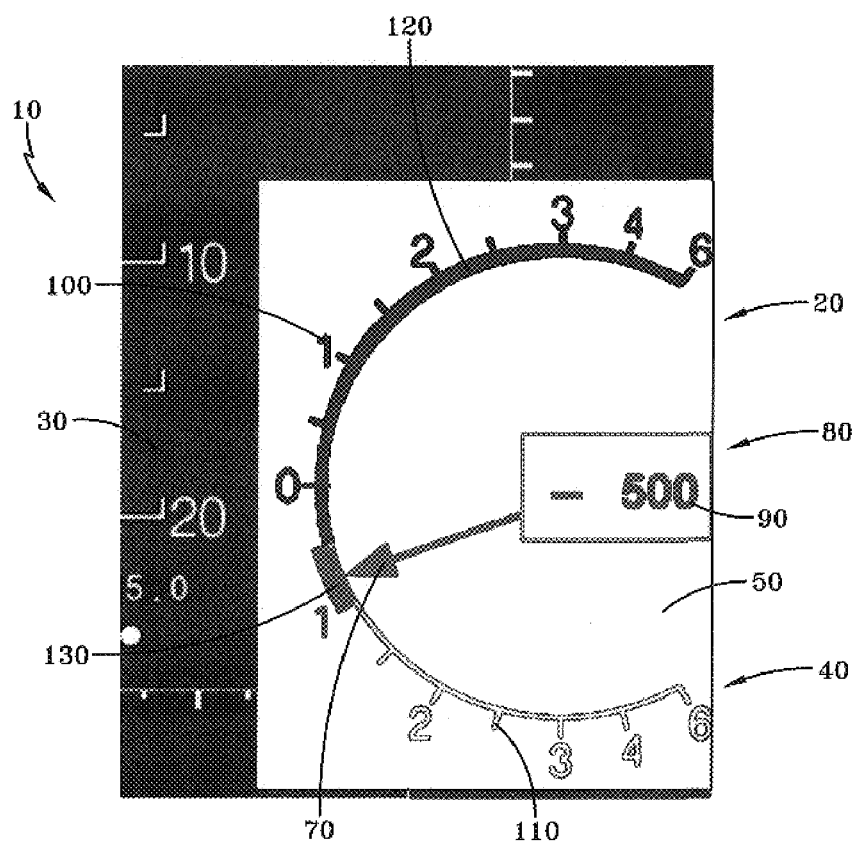
FIG. 1 illustrates an example embodiment of the VSI display of the present invention.
Figure 2:
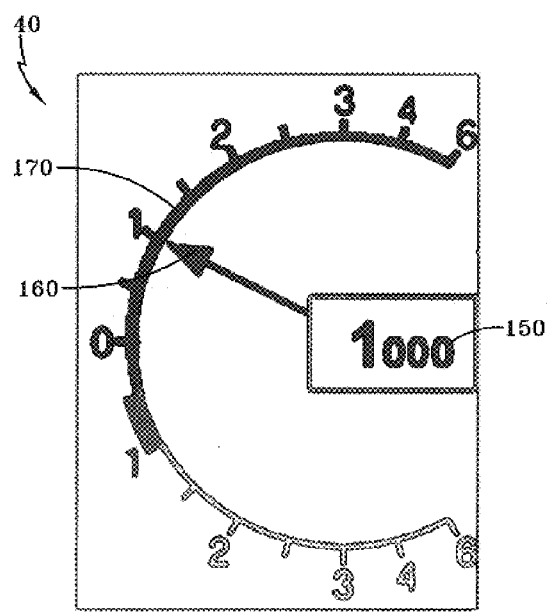
FIG. 2 illustrates a first embodiment of a VSI display of the present invention, showing a TCAS resolution advisory in the "red" zone.
Figure 3:
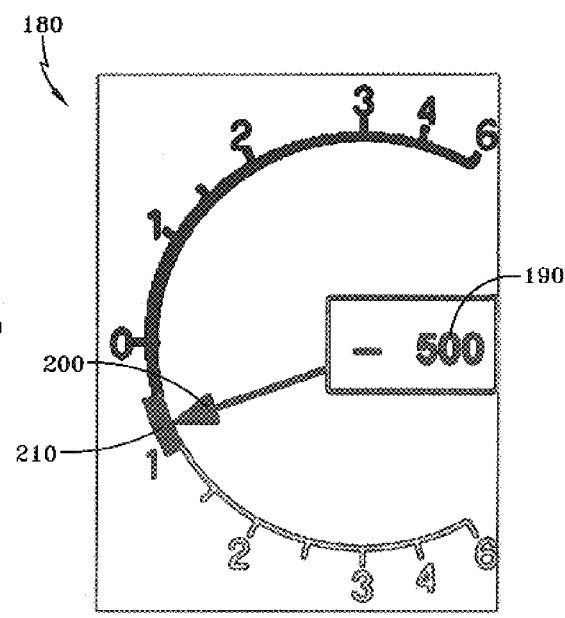
FIG. 3 illustrates a second embodiment of a VSI display of the present invention, showing a TCAS resolution advisory in a "fly to" zone.

As can be noted in FIGS. 1 through 3 of the example embodiments of the present invention, the object of the present invention is to provide a display of a vertical speed indicator (VSI) having TCAS resolution advisory indicators along a periphery of the VSI scale.

FIG. 1 illustrates an example embodiment of a TCAS VSI display of the present invention. As shown in FIG. 1, a portion of a PFD display 10 is shown with the TCAS VSI display 20 overlying a portion of adjacent depictions of flight information 30. In this example embodiment of the present invention, an enlarged TCAS VSI display 20 overlying a portion of adjacent depictions of flight information 30 during TCAS or resolution advisory flight conditions is to be contrasted with a typical PFD display of a VSI during non-TCAS traffic or resolution advisory flight conditions. The enlarged TCAS VSI display 20 of the present invention allows a flight crew to better view flight instructions that are intended to avoid collisions with approaching aircraft. In contrast, during non-TCAS traffic, the VSI display would typically be sized to a complementary fit on the PFD and provide VSI information to the flight crew.

As shown in FIG. 1, the TCAS VSI display 20 example of the present invention shows a full range depiction of a VSI scale 40 on a contrasting background 50. The VSI scale 40 is shown with graduations 110 along its arc to denote indices for units of measurement of vertical speed. In this example, the full range depiction of the VSI scale 40 is +/−6,000 feet per minute. In other embodiments of the present invention, a full range depiction of a VSI scale can be increased or deceased as desired for the aircraft application. Typical ranges for the scale of vertical speed would be +/−2,000, +/−3,000, and +/−4,000 feet per minute. The range may also be represented in metric measurements and for different time intervals, for example the range of vertical speed scale may shown in units comprising meters (for distance) or seconds (for time).

FIG. 1 also shows an example depiction of a vertical speed marker 70 as an arrow. The vertical speed marker 70 of the present invention shows the current vertical speed of the aircraft on the VSI scale 40. Also shown is an example viewing window 80 displaying a numeric display 90 of the current vertical speed of the aircraft.

Along the periphery of the VSI scale 40 are TCAS resolution advisory indicators 100. The TCAS indicators on the VSI are typically highlighted with a green color to indicate vertical speeds that a pilot is instructed to actively fly-to or maneuver the aircraft to satisfy a resolution advisory and to achieve safe separation from an approaching aircraft. In contrast the TCAS indicators on the VSI are typically highlighted with a red color to indicate vertical speeds that must be avoided as no-fly segments. Although not shown in color on FIG. 1, the example embodiment is shaded to indicate the typical usage of a red arc 120 along at least a portion of the periphery of the VSI scale 40 to indicate a no-fly segment and the typical usage of a green arc 130 along at least a portion of the periphery of the VSI scale 40 to indicate a fly-to segment.

FIGS. 2 and 3 illustrate example embodiments of the TCAS VSI display of the present invention. As shown at 140, the digital display of vertical speed 150 and pointer 160 are shown in a shading to indicate an example a red-colored display when the current vertical speed of an aircraft is within a no-fly segment 170 of the TCAS resolution advisory indicators. In contrast, as shown at 180, the digital display of vertical speed 190 and pointer 200 are shown in a shading to indicate an example a green-colored display when the current vertical speed of an aircraft is within a fly-to segment 210 of the TCAS resolution advisory indicators.

Having shown and described example embodiments of the present invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

We claim:

1. An electronic display on an aircraft for presenting "fly-to" commands on a vertical speed indicator during a TCAS traffic or resolution advisory condition, wherein said display comprises:

a full range, semicircular depiction of a vertical speed indicator scale;

a vertical speed indicator marker;

a viewing window showing a digital readout of the current vertical speed of said aircraft; and TCAS resolution advisory indicators along a periphery of said vertical speed indicator scale, wherein said vertical speed indicator scale is comprised of graduations along an arc;

wherein said vertical speed indicator marker shows the current vertical speed of said aircraft on said vertical speed indicator scale; and wherein the size of said display is enlarged relative to the size of a vertical speed indicator scale shown during non-TCAS traffic or resolution advisory conditions.

2. The electronic display of claim 1, wherein said display overlies at least a portion of adjacent depictions of other flight information on a common viewing device.

3. The electronic display of claim 2, wherein said common viewing device is a LCD screen.

4. The electronic display of claim 1, wherein said adjacent depictions of other flight information is comprised of altitude.

5. The electronic display of claim 1, wherein said adjacent depictions of other flight information is comprised of heading.

6. The electronic display of claim 1, wherein said vertical speed scale has a continuous range with indices at 0 (zero) feet per minute, ±500 feet per minute, ±1000 feet per minute, ±1500 feet per minute, ±2000 feet per minute, ±2500 feet per minute, ±3000 feet per minute, ±4000 feet per minute, ±5000 feet per minute, and ±6000 feet per minute.

7. The electronic display of claim 1, wherein said vertical speed indicator marker is comprised of a pointer.

8. The electronic display of claim 1, wherein said vertical speed indicator marker is comprised of a numeric display.

9. The electronic display of claim 1, wherein said vertical speed indicator marker is comprised of a pointer and a numeric display.

10. The electronic display of claim 1, wherein said TCAS resolution advisory indicators are comprised of at least one red arc and at least one green arc;

wherein said red arc indicates a no-fly segment; and wherein said green arc indicates a fly-to segment.

11. The electronic display of claim 10, wherein said vertical speed indicator marker is shown in a red color when said current vertical speed of said aircraft is within said no-fly segment of said TCAS resolution advisory indicators.

12. The electronic display of claim 10, wherein said vertical speed indicator marker is shown in a green color when said current vertical speed of said aircraft is within said fly-to segment of said TCAS resolution advisory indicators.

13. The electronic display of claim 10, wherein at least a portion of said vertical speed indicator scale lying along said no-fly segment is shown in a red color.

14. The electronic display of claim 10, wherein at least a portion of said vertical speed indicator scale lying along said fly-to segment is shown in a green color.

15. The electronic display of claim 10, wherein said digital readout in said viewing window is shown in a red color when said current vertical speed of said aircraft is within said no-fly segment of said TCAS resolution advisory indicators.

16. The electronic display of claim 10, wherein said digital readout in said viewing window is shown in a green color when said current vertical speed of said aircraft is within said fly-to segment of said TCAS resolution advisory indicators.

* * * * *